United States Patent
Cleveland

(10) Patent No.: US 7,158,560 B2
(45) Date of Patent: Jan. 2, 2007

(54) RF RECEIVER HAVING IMPROVED SIGNAL-TO-NOISE RATIO AND METHOD OF OPERATION

(75) Inventor: Joseph R. Cleveland, Richardson, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 382 days.

(21) Appl. No.: 10/761,476

(22) Filed: Jan. 21, 2004

(65) Prior Publication Data

US 2004/0151234 A1 Aug. 5, 2004

Related U.S. Application Data

(63) Continuation of application No. 09/606,892, filed on Jun. 29, 2000, now Pat. No. 6,683,908.

(51) Int. Cl.
*H04B 1/707* (2006.01)

(52) U.S. Cl. .................................................. 375/148

(58) Field of Classification Search ................ 375/148, 375/130, 144, 147, 346; 370/342, 441
See application file for complete search history.

(56) References Cited

U.S. PATENT DOCUMENTS

| 5,768,307 | A  | * | 6/1998 | Schramm et al. |
| 6,373,881 | B1 | * | 4/2002 | Mizuguchi et al. |
| 6,452,377 | B1 | * | 9/2002 | Clark |

* cited by examiner

*Primary Examiner*—Kevin Kim

(57) ABSTRACT

There is disclosed, for use in a CDMA receiver, a noise reduction circuit for improving the signal-to-noise ratio of a received CDMA signal comprising a series of chip sequences. The noise reduction circuit comprises: 1) a sampling circuit for generating an original plurality of samples of the received signal; and 2) a controller for determining a first plurality of time slots containing chip samples equal to Logic 1, and a second plurality of time slots containing chip samples equal to Logic 0. The controller generates a reconstructed plurality of samples by at least one of: a) modifying an order of a first Logic 1 chip sample and a second Logic 1 chip sample; and b) modifying an order of a first Logic 0 chip sample and a second Logic 0 chip sample.

20 Claims, 5 Drawing Sheets

RF RECEIVER HAVING IMPROVED SIGNAL-TO-NOISE RATIO AND METHOD OF OPERATION

This application is a continuation of prior U.S. patent application Ser. No. 09/606,892 filed on Jun. 29, 2000 now U.S. Pat. No. 6,683,908.

TECHNICAL FIELD OF THE INVENTION

The present invention is directed, in general, to wireless communications devices and, more specifically, to an RF receiver having a lower signal-to-noise ratio.

BACKGROUND OF THE INVENTION

Wireless communications systems, including cellular phones, paging devices, personal communication services (PCS) systems, and wireless data networks, have become ubiquitous in society. Wireless service providers continually try to create new markets for wireless devices and to expand existing markets by making wireless devices and services cheaper and more reliable. The price of end-user wireless devices, such as cell phones, pagers, PCS systems, and wireless modems, has been driven down to the point where these devices are affordable to nearly everyone and the price of a wireless device is only a small part of the end-user's total cost. To continue to attract new customers, wireless service providers concentrate on reducing infrastructure costs and operating costs, and on increasing handset battery lifetime, while improving quality of service in order to make wireless services cheaper and better.

To maximize usage of the available bandwidth, a number of multiple access technologies have been implemented to allow more than one subscriber to communicate simultaneously with each base station (BS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

CDMA technology is used in wireless computer networks, paging (or wireless messaging) systems, and cellular telephony. In a CDMA system, mobile stations (e.g., pagers, cell phones, laptop PCs with wireless modems) and base stations transmit and receive data in assigned channels that correspond to specific unique codes. For example, a mobile station may receive forward channel data signals from a base station that are convolutionally coded, formatted, interleaved, spread with a Walsh code and a long pseudo-noise (PN) sequence. In another example, a base station may receive reverse channel data signals from the mobile station that are convolutionally encoded, block interleaved, modulated by a 64-ary orthogonal modulation, and spread prior to transmission by the mobile station. The data symbols following interleaving may be separated into an in-phase (I) data stream and a quadrature (Q) data stream for QPSK modulation of an RF carrier. One such implementation is found in the TIA IS-95 CDMA standard. Another implementation is the TIA S-2000 standard. The order of the Walsh code spreading or 64-ary modulation and PN spreading does not affect the performance of the present invention disclosed below in the DETAILED DESCRIPTION OF THE INVENTION.

A data bit equal to Logic 1 in the convolutionally encoded symbols is transmitted as one 64-chip Walsh code and a data bit equal to Logic 0 is transmitted as the inverse of the 64-bit Walsh code, obtained as an exclusive-OR (XOR) between the data bit and the Walsh code.

In order to increase the reliability of CDMA receivers, base stations and mobile stations frequently transmit M copies of the same signal, staggered in time, to the other device. The receiving device typically uses multiple receive paths, such as in a rake receiver, to capture each of the copies. The captured copies are summed to produce a composite signal in order to improve the signal to noise ratio. This allows the composite signal to be more easily de-spread and recognized by a signal correlator or matched filter. However, this approach requires a large number of components and a large circuit area. Additionally, the repeated transmission of M copies of the same signal is wasteful of scarce bandwidth.

There is therefore a need in the art for improved CDMA systems that have an improved signal-to-noise ratio in the receiver. In particular, there is a need for CDMA systems that do not require the transmission of multiple copies of a signal from a transmitter to a receiver. More particularly, there is a need for an improved CDMA receiver capable of improving the signal-to-noise ratio of a single copy of a received signal.

SUMMARY OF THE INVENTION

To address the above-discussed deficiencies of the prior art, it is a primary object of the present invention to provide, for use in a CDMA receiver, a noise reduction circuit for improving a signal-to-noise ratio of a received signal comprising a series of chip sequences. In an advantageous embodiment, the noise reduction circuit comprises: 1) a sampling circuit for generating an original plurality of samples of the received signal; and 2) a controller capable of determining a first plurality of time slots, each of the first plurality of time slots comprising a plurality of chip samples corresponding to Logic 1, and a second plurality of time slots, each of the second plurality of time slots comprising a plurality of chip samples corresponding to Logic 0, wherein the controller is capable of generating a reconstructed plurality of samples by at least one of: a) modifying an order of a first Logic 1 chip sample and a second Logic 1 chip sample; and b) modifying an order of a first Logic 0 chip sample and a second Logic 0 chip sample.

CDMA provides the foundation for the present invention since the coding and spreading sequence (i.e., chip sequence per bit) are known by both the transmitter and receiver.

In one embodiment of the present invention, the controller adds the reconstructed plurality of samples and the original plurality of samples to generate a composite signal having a reduced signal-to-noise ratio.

The controller uses a correlator or matched filter to de-spread the received signal and the composite signal. If the matched filter or correlator output does not indicate a signal match with the desired code, the controller generates a new pseudo-signal, sums it with the previously generated pseudo-signal sum and repeats the de-spreading function. The process repeats until the correlator output indicates a signal match with a signal-to-noise ration ($E_b/N_o$) greater that a prescribed threshold or until the execution of a set number of cycles. This process performs coherent combination of the samples that represent the digital data signal states since the signal states are the amplitude +a (for a chip state of Logic 1) and the amplitude −a (for a chip state of Logic 0). The noise components combine with random phase. Therefore, the larger the number of summed pseudo-signals, the smaller the noise contribution.

According to another embodiment of the present invention, the CDMA receiver is a receiver in a base station of a wireless network.

According to still another embodiment of the present invention, the CDMA receiver is a receiver in a mobile station capable of communicating with a wireless network.

According to yet another embodiment of the present invention, the first Logic 1 chip sample and the second Logic 1 chip sample are contained within a single chip.

According to a further embodiment of the present invention, the first Logic 0 chip sample and the second Logic 0 chip sample are contained within a single chip.

According to a still further embodiment of the present invention, the first Logic 1 chip sample and the second Logic 1 chip sample are contained within different chips and the first Logic 0 chip sample and the second Logic 0 chip sample are contained within different chips.

According to a yet further embodiment of the present invention, the controller one of modifies the order of the first and second Logic 1 chip samples and modifies the order of the first and second Logic 0 chip samples according to one of a random process algorithm and a predetermined algorithm.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged radio frequency (RF) receiver.

Figure 1:
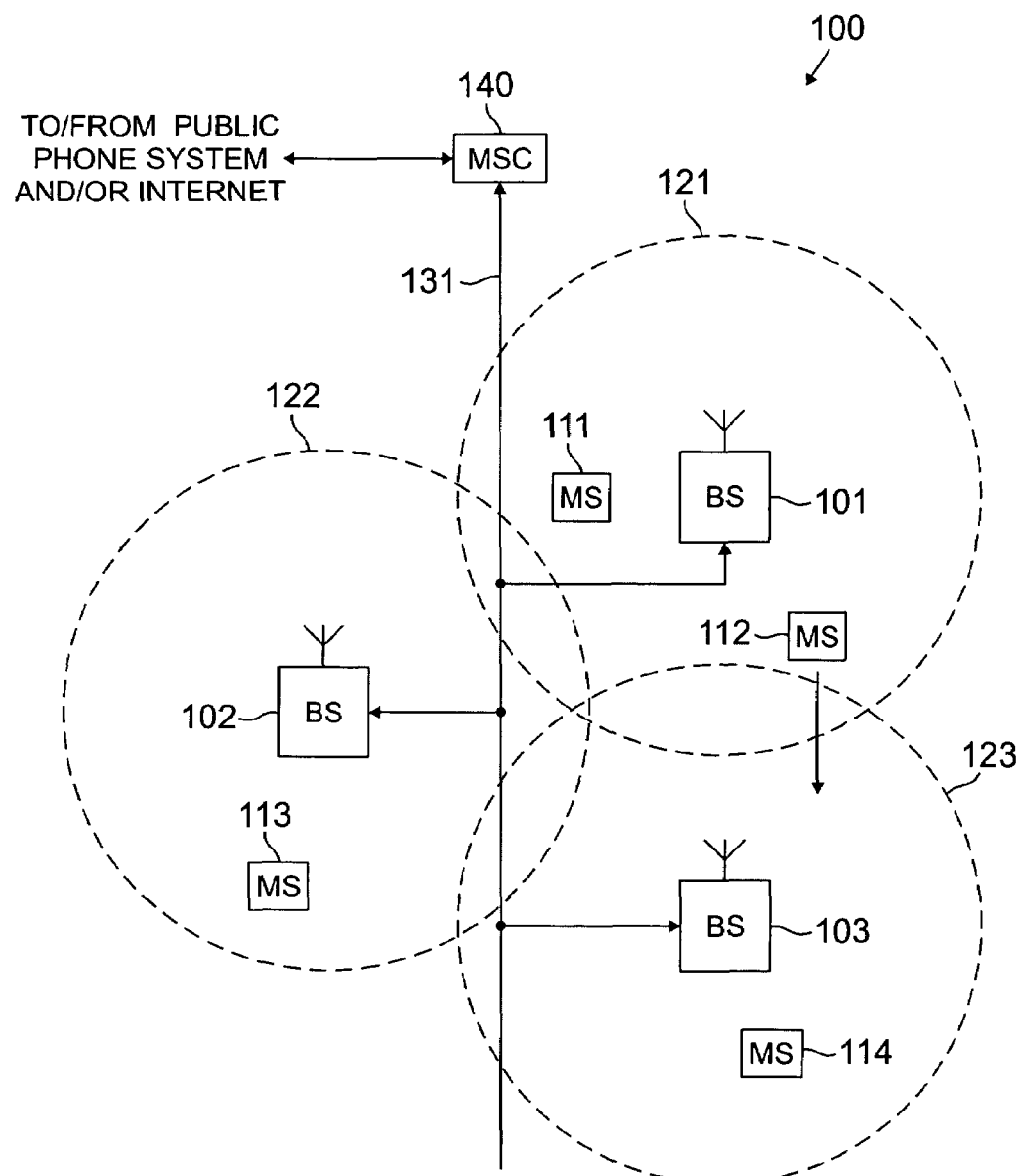
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cell sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Communications line 131 may be any suitable connection means, including a T1 line, a T3 line, a fiber optic link, a network backbone connection, and the like. Mobile switching center 140 is well known to those skilled in the art. Mobile switching center 140 is a switching device that provides services and coordination between the subscribers in a wireless network and external networks, such as the public telephone system. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. The MS 112 is also located in cell site 121, close to the edge of cell site 123. The direction arrow proximate. MS 112 indicates the movement of MS 112 towards cell site 123. At some point, as MS 112 moves into cell site 123 and out of cell site 121, a "handoff" will occur.

As is well know, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Wireless network 100 is a CDMA network in which, for example, MS 112 and BS 101 transmit and receive data in control channels and traffic channels using unique codes, such as 64-bit Walsh codes, for example. In accordance with the principles of the present invention, MS 112 and BS 101 do not require that the other device transmit multiple copies of a signal, as in the case of prior art CDMA systems. Alternatively, MS 112 and BS 101 may require that the other device transmit a lesser number of copies of a signal than the prior art CDMA systems. As will be explained below in greater detail, MS 112 and BS 101 are capable of capturing samples of a single copy of an incoming signal and generating one or more new "pseudo-signals" by reordering the samples of the original received signal. The pseudo-signal(s) and the original signals may then be combined to produce a composite signal having an improved signal-to-noise ratio.

Figure 2:
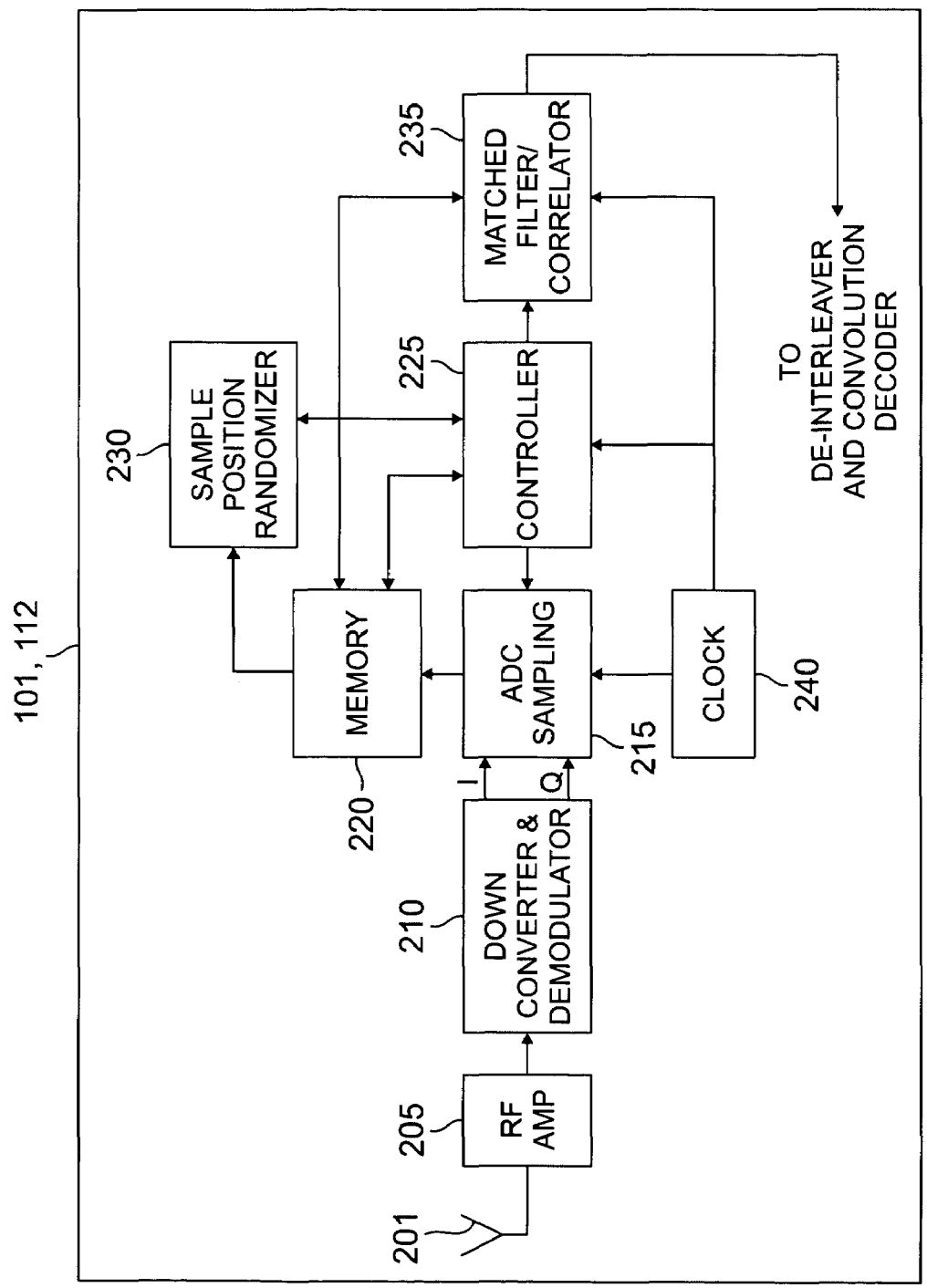
FIG. 2 illustrates exemplary portions of the receiver circuitry in a base station and a mobile station according to one embodiment of the present invention.

FIG. 2 illustrates exemplary portions of the receiver circuitry in base station 101 and mobile station 112 according to one embodiment of the present invention. Base station 101 and mobile station 112 each comprise antenna 201, radio frequency (RF) amplifier 205, downconverter and demodulation circuit 210, and analog-to-digital (ADC) sampling circuit 215. RF amplifier 205 amplifies incoming radio frequency (RF) signals detected by antenna 201 to a usable level. Downconverter and demodulation circuit 210 demodulates (downconverts) the amplified RF signals to in-phase (I) and quadrature (Q) baseband signals. Each of the I and Q baseband signals comprises a mixture of noise signals and a sequence of chip patterns corresponding to Logic 1 or Logic 0. For example, a Logic 1 data bit may be represented by a first chip pattern comprising a unique 64-bit Walsh code and a Logic 0 data bit may be represented by a second chip pattern that is the inverse of the unique 64-bit Walsh code. ADC sampling circuit 215 samples and digitizes each I and Q baseband signal. ADC sampling circuit 215 stores the digital samples of the digital I and Q baseband signals in memory 220.

Those skilled in the art will recognize that ADC sampling circuit 215 may consist of two ADC sampling circuits, one for the I baseband signal and one for the Q baseband signal. Those skilled in the art will also recognize that memory 220 may consist of two memory sections, one for storage of sampled data for the I baseband signal and one for storage of sampled data for the Q baseband signal.

Base station 101 and mobile station 112 further comprise controller 225, sample position randomizer 230, matched filter/correlator 235 (hereafter "correlator 235"), and clock 240. Controller 225, under the direction of application programs stored in memory 220, controls ADC sampling circuit 215, correlator 235, and sample position randomizer 230 and processes their outputs until a match is found with the unique Logic 1 or Logic 0 Walsh code. In particular, controller 225 may control the sampling rate and frequency for ADC sampling circuit 215 for each of the I and Q signals and the matching process for correlator 235 for each of the I and Q signals. Controller 225 also controls sample position randomizer 230 when a match is not found in a particular sample sequence for the I and Q signals. Further, controller 225 sums the outputs of sample position randomizer 230 with the previous sampled and processed I and Q signals and transfers the result to correlator 235 for further processing. Thus, controller 225 produces a summed signal output for the I and Q signals which increases the desired signal level with respect to the undesired noise level, thereby increasing the signal-to-noise ratio and increasing the probability of successfully detecting the desired signal.

When a Logic 1 or Logic 0 match for the unique 64-bit Walsh code is not detected, controller 225 activates sample position randomizer 230. Sample position randomizer 230 randomly shifts samples of the Logic 1 and Logic 0 Walsh code chips for the previously compared signal and transfers this result to correlator 235 for processing. Depending upon the amount of signal noise, sample position randomizer 230 may provide one to N variations of samples of the incoming signal.

Correlator 235 compares and correlates the samples of the incoming signal with the unique Walsh codes for Logic 1 and Logic 0. When a match is found, correlator 235 transfers the matched Logic 1 or Logic 0 to the de-interleaver and decoder of BS 101 and MS 112 for processing. Clock 240 provides the required timing signals for the components of BS 101 and MS 112, including ADC sampling circuit 215, memory 220, controller 225, and correlator 235.

Figure 3A:
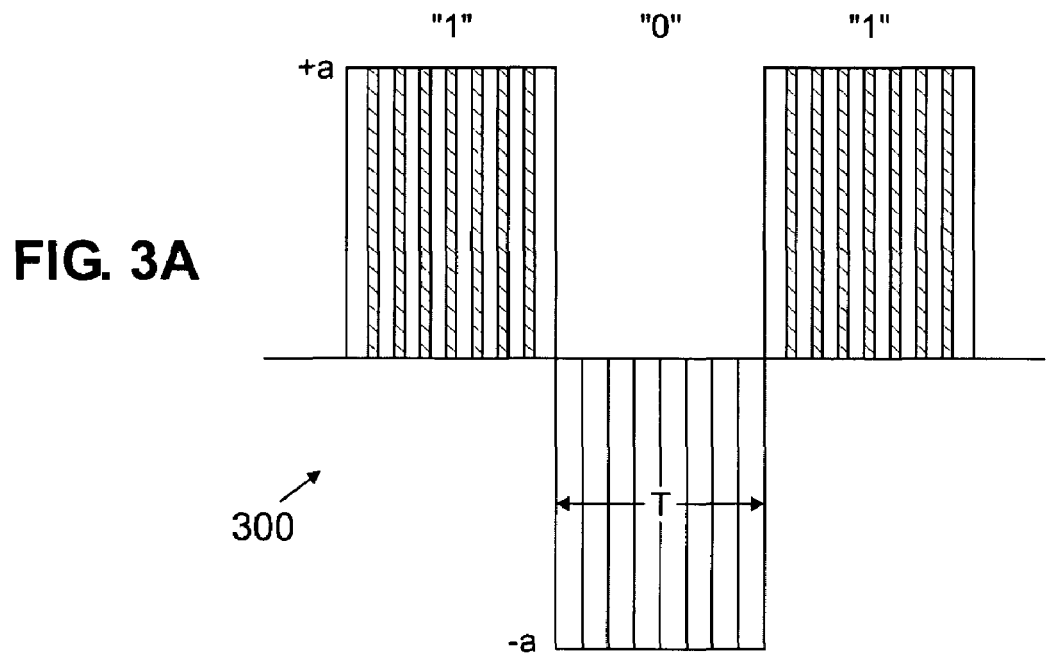
FIGS. 3A and 3B illustrate the constituent parts of an incoming noisy binary signal received by a mobile station or a base station.
Figure 3B:
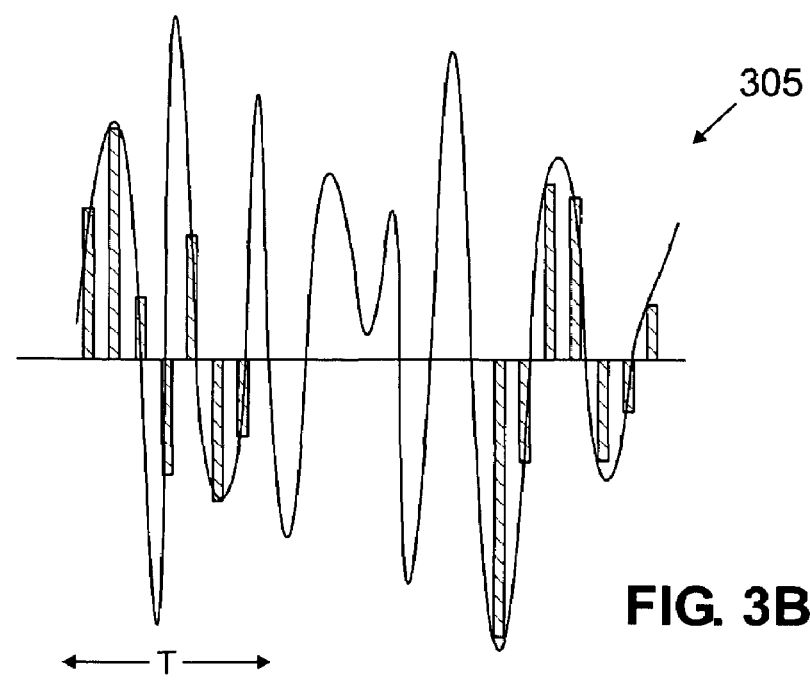

FIGS. 3A and 3B illustrate the constituent parts of an incoming noisy binary I or Q signal received by BS 101 or MS 112. Signal 300 in FIG. 3A represents the original information signal that is captured by BS 101 or MS 112. Signal 305 in FIG. 3B represents the noise signal that is mixed with information signal 300 during transmission in the forward and reverse channels. Signal 300 depicts a sequence of chips in a Logic 1 or Logic 0 Walsh code, where the sequence of chips includes two binary 1 chips having amplitudes of +a and one binary 0 chip having an amplitude of −a. The shaded vertical lines represent sample points with the chips. Each chip occurs in a time slot having a duration T. Under ideal conditions, BS 101 or MS 112 receives and matches signal 300 with its corresponding unique Walsh code for a Logic 1 or Logic 0 bit, with no need for further transmission or signal filtering.

However, as shown by FIG. 3B, received signals usually contain random noise components which are introduced between the points of transmission and reception. Noise signal 305 is the random noise component of a received signal, with the shaded vertical bars representing the positive and negative values of the sampled noise components. Time period T is shown for comparison purposes with signal 300. When the sample components of noise signal 305 exceed a minimum threshold level, noise signal 305 may prevent the successful recovery of signal 300 unless filtering techniques according to the principles of the present invention are used.

Figure 4A:
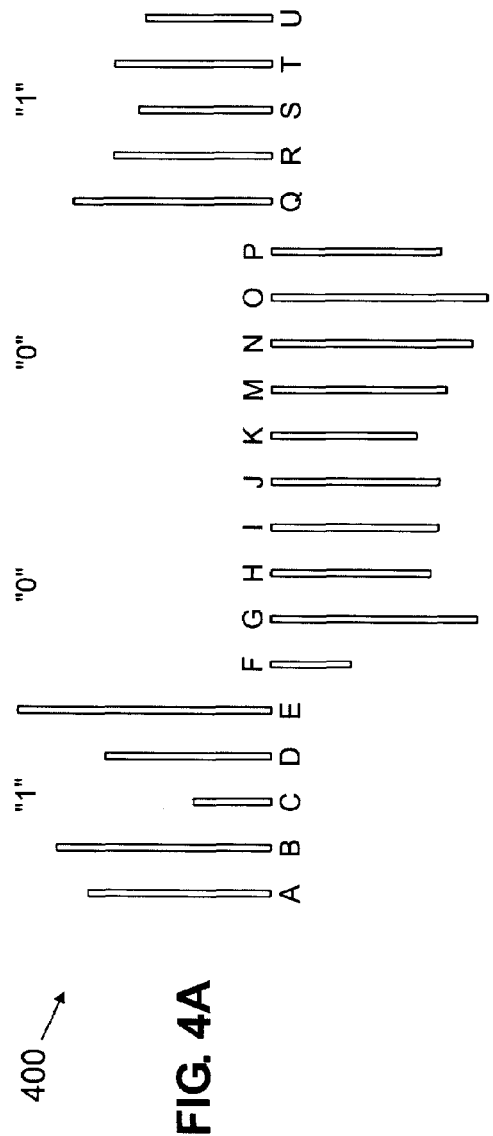
FIG. 4A illustrates an original sampled signal captured by a base station or a mobile station according to one embodiment of the present invention.

FIG. 4A illustrates original sampled signal 400 captured by BS 101 or MS 112 according to one embodiment of the present invention. Original sampled signal 400 comprises positive going samples for two binary 1 chips and negative going samples for two binary 0 chips from a Walsh code sequence. Each chip comprises five samples, with samples labeled A through U. The first binary 1 chip occurs in the first time slot of duration T and comprises samples A through E. The second binary 1 chip occurs in the fourth time slot of duration T and comprises samples Q through U. The first binary 0 chip occurs in the second time slot of duration T and comprises samples F through J. The second binary 0 chip occurs in the third time slot of duration T and comprises samples K through P.

Figure 4B:
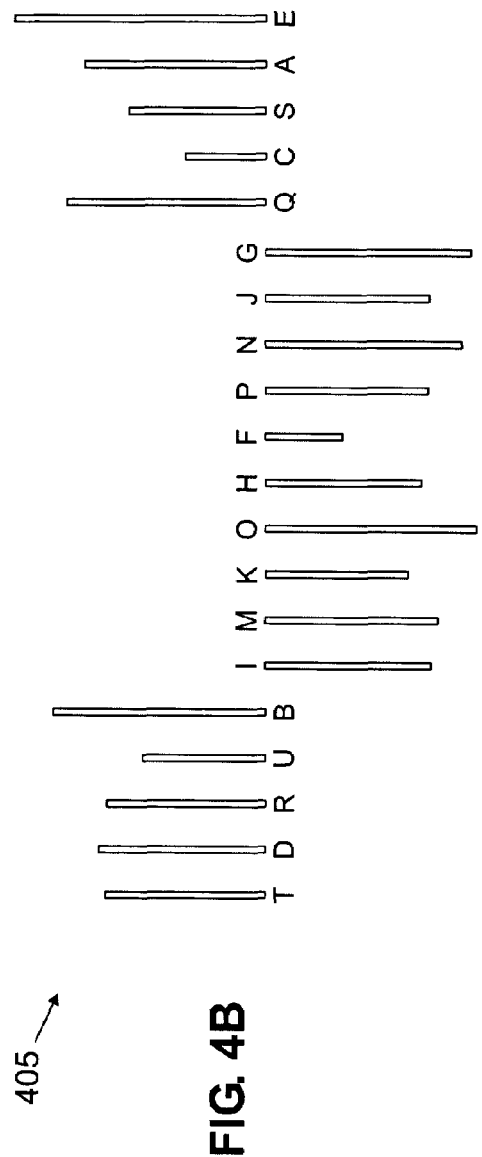
FIG. 4B illustrates a reconstructed pseudo-signal created in a base station or a mobile station by reordering the digital samples in the original sampled signal in FIG. 4A according to one embodiment of the present invention.

FIG. 4B illustrates reconstructed pseudo-signal 405 created in BS 101 or MS 112 by reordering the digital samples in original sampled signal 400 according to one embodiment of the present invention. Like original sampled signal 400, reconstructed pseudo-signal 405 comprises two binary 1 chips (first and fourth time slots) and two binary 0 chips (second and third time slots) and contains the same number of samples as original sampled signal 400. However, the positions of the binary 1 chip samples have been randomly interchanged with each other. Similarly, the positions of the binary 0 chip samples have been randomly interchanged with each other. This is done for noise elimination purposes.

For example, samples F through P are still associated with binary 0 chips, but the order has been changed from the prior alphabetical order of original sampled signal 400 to a random order of I, M, K, O, H, F, P, N, J, and G. Some of the re-ordered samples remain within the same time slot and some of the re-ordered samples have moved to a different time slot. Similarly, the sample order has changed for the binary 1 chips, with some of the re-ordered samples remaining within the same time slot and some of the re-ordered samples moving to a different time slot. Thus, reconstructed pseudo-signal 405 looks like a new sequence of samples from a new received signal, even though reconstructed pseudo-signal 405 is entirely derived from original sampled signal 400. Reconstructed pseudo-signal 405 may be used to recover the original information signal from the received noisy signal. Thus, it is unnecessary to retransmit multiple copies of the original information signal.

Controller 225 and sample position randomizer 230 repeatedly re-order the chip samples and add the re-ordered samples to a sum of the original samples and previous re-ordered samples for each I and Q signal. Over multiple iterations this causes the correlated components of the original information signal to mutually add and causes the components of the noise signal to mutually cancel each other, since the noise signal is random and may contain both positive and negative values during each binary 1 chip or binary 0 chip.

Figure 5:
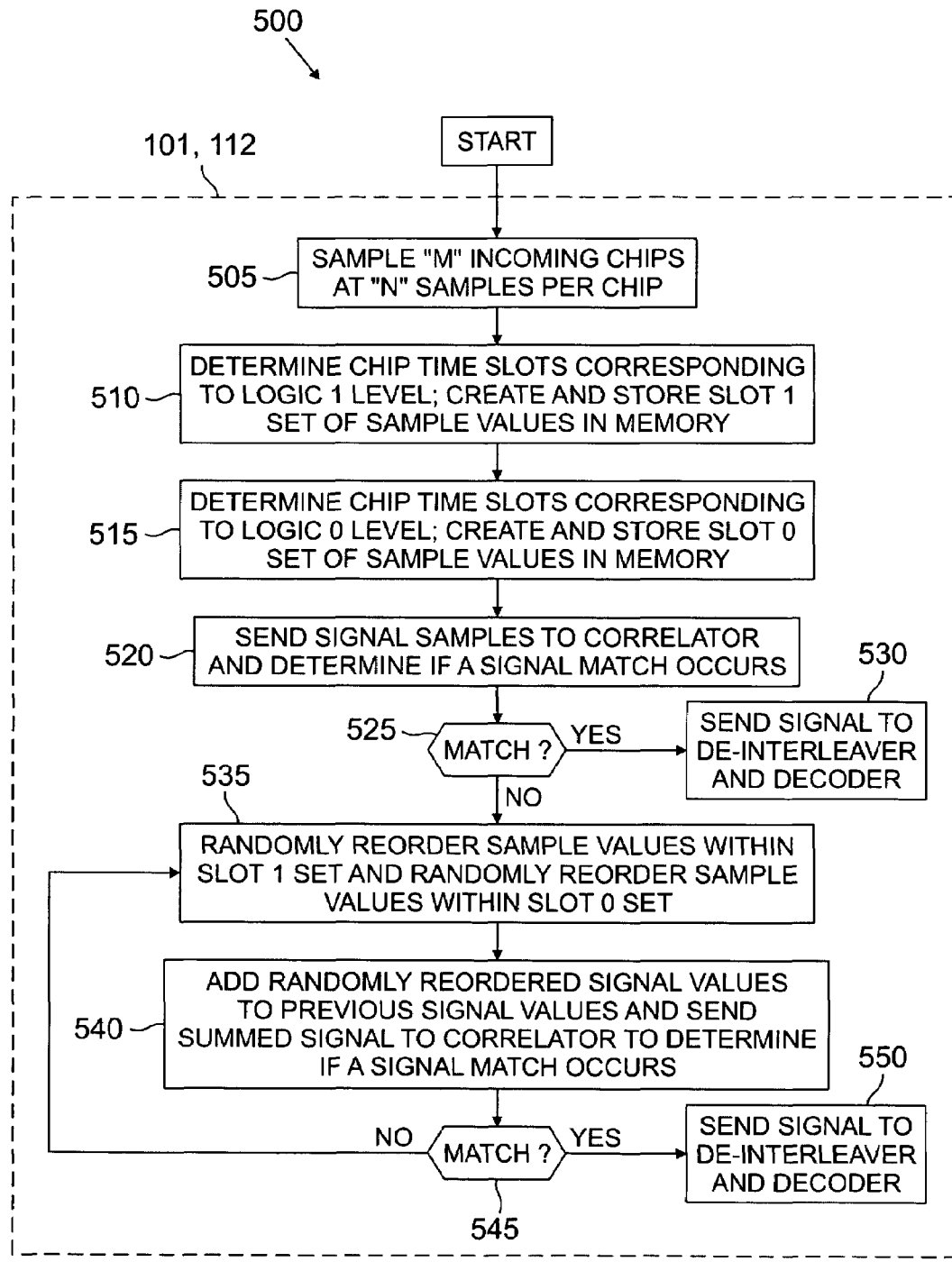
FIG. 5 is a flow diagram illustrating the operation of the receiver circuitry in an exemplary base station or mobile station according to one embodiment of the present invention.

FIG. 5 depicts flow diagram 500, which illustrates the operation of the receiver circuitry in exemplary base station 101 or exemplary mobile station 112 according to one embodiment of the present invention. After an incoming CDMA signal is amplified and downconverted to I and Q baseband signals, ADC sampling circuit 215 samples the "M" incoming chips of the I and Q baseband signals at "N" samples per chip (process step 505). The samples are stored in memory 220. In one embodiment, M may equal 64 for a Walsh code sequence.

Next, controller 225 uses synchronization signals from clock 240 to determine chip time slots during which binary 1 (or Logic 1) chips occur and stores the samples from the binary 1 chips in a SLOT 1 set of samples in memory 220 (process step 510). Similarly, controller 225 uses synchronization signals from clock 240 to determine chip time slots during which binary 0 (or Logic 0) chips occur and stores the samples from the binary 0 chips in a SLOT 0 set of samples in memory 220 (process step 515).

Controller 225 sends a copy of the incoming signal samples to correlator 235 for comparison with the required Walsh codes for Logic 1 and Logic 0 (process step 520). If a match occurs, the matched signal is transferred to a de-interleaver and decoder for further processing (process steps 525 and 530).

If a match does not occur, sample position randomizer 230 randomly reorders sample values within a copy of the original SLOT 1 set and also randomly reorders sample values within a copy of the original SLOT 0 set (process steps 525 and 535). Next, controller 225 adds the randomly reordered signal samples to the original signal samples, to thereby produce a summed sample signal. Controller 225 then causes correlator 235 to compare summed sample signal to the Walsh codes for Logic 1 and Logic 0 to determine if a match occurs (process step 540).

If a match occurs, correlator 235 transfers the matched signal to de-interleaver and decoder (process steps 545 and 550). If a match does not occur, sample position randomizer 230 again randomly reorders the sample values within a copy of the original SLOT 1 set and also randomly reorders sample values within a copy of the original SLOT 0 set (repeat process step 535). Controller 225 then adds the randomly reordered signal samples to the previous summed signal sample to thereby produce a new summed sample signal. Thus, process steps 535, 540, and 545 repeat until a match occurs or for a predetermined number of iterations, in which case a error is returned.

The present invention improves the performance of wireless digital communications systems by: (1) reducing the required $E_b/N_o$ at the CDMA receiver and detector; (2) reducing the transmit power required by transmitters for reliable transmission; (3) reducing the interference caused by multiple transmitters in the assigned spectrum; and (4) reducing the battery power required for mobile stations. It will have a particularly beneficial effect on spectrum utilization by communications systems that employ code division multiple access (CDMA) techniques where all transmitters use the same spectrum by reducing potential interference from other users.

An improved $E_b/N_o$ at the vocoder results in reduced transmit power at the mobile station through the reverse link power control. Similarly, an improved $E_b/N_o$ at the mobile station detector results in lower frame error rate and reduced transmit power at the base station through the forward link power control.

In an alternate embodiment of the present invention, the controller generates the sum of K pseudo-signals prior to performing the de-spreading function with the matched filter or correlator.

In another alternate embodiment of the present invention, the controller places the sampled values in time slots in a predefined order in a sample template based on a lookup table or interleaver matrix.

Although the present invention has been described in detail, those skilled in the art should understand that they can make various changes, substitutions and alterations herein without departing from the spirit and scope of the invention in its broadest form.

What is claimed is:

1. For use in a CDMA receiver, a noise reduction circuit for improving a signal-to-noise ratio of a received signal comprising a predetermined sequence of chips, each of said chips having a value corresponding to Logic 0 or Logic 1, said noise reduction circuit comprising:
   a sampling circuit capable of generating a first sequence of samples from said received signal; and
   a controller capable of identifying samples in said first sequence of samples corresponding to Logic 0 chips and identifying samples in said first sequence of samples corresponding to Logic 1 chips, wherein said controller is further capable of generating a second sequence of samples by at least one of:
      shifting positions within said first sequence of samples of at least some of said identified samples corresponding to Logic 0 chips, wherein each of said shifted samples corresponding to Logic 0 chips is shifted from a first position corresponding to a Logic 0 chip to a second position corresponding to a Logic 0 chip; and
      shifting positions within said first sequence of samples of at least some of said identified samples corresponding to Logic 1 chips, wherein each of said shifted samples corresponding to Logic 1 chips is shifted from a first position corresponding to a Logic 1 chip to a second position corresponding to a Logic 1 chip.

2. The noise reduction circuit set forth in claim 1 wherein said controller adds said first and second sequences of samples to generate a composite signal having a reduced signal-to-noise ratio.

3. The noise reduction circuit set forth in claim 1 wherein said CDMA receiver is disposed in a base station of a wireless network.

4. The noise reduction circuit set forth in claim 1 wherein said CDMA receiver is disposed in a mobile station capable of communicating with a wireless network.

5. The noise reduction circuit set forth in claim 1 wherein said controller shifts positions of said at least some of said identified samples corresponding to Logic 0 chips according to one of a random process algorithm and a predetermined algorithm.

6. The noise reduction circuit set forth in claim 1 wherein said controller shifts positions of said at least some of said identified samples corresponding to Logic 1 chips according to one of a random process algorithm and a predetermined algorithm.

7. A CDMA wireless network comprising a plurality of base stations, each of said base stations comprising a noise reduction circuit for improving a signal-to-noise ratio of a received signal comprising a predetermined sequence of chips, each of said chips having a value corresponding to Logic 0 or Logic 1, said noise reduction circuit comprising:
   a sampling circuit capable of generating a first sequence of samples from said received signal; and
   a controller capable of identifying samples in said first sequence of samples corresponding to Logic 0 chips and identifying samples in said first sequence of samples corresponding to Logic 1 chips, wherein said controller is further capable of generating a second sequence of samples by at least one of:
      shifting positions within said first sequence of samples of at least some of said identified samples corresponding to Logic 0 chips, wherein each of said shifted samples corresponding to Logic 0 chips is shifted from a first position corresponding to a Logic 0 chip to a second position corresponding to a Logic 0 chip; and
      shifting positions within said first sequence of samples of at least some of said identified samples corresponding to Logic 1 chips, wherein each of said shifted samples corresponding to Logic 1 chips is shifted from a first position corresponding to a Logic 1 chip to a second position corresponding to a Logic 1 chip.

8. The CDMA wireless network set forth in claim 7 wherein said controller adds said first and second sequences of samples to generate a composite signal having a reduced signal-to-noise ratio.

9. The CDMA wireless network set forth in claim 7 wherein said controller shifts positions of said at least some of said identified samples corresponding to Logic 0 chips according to one of a random process algorithm and a predetermined algorithm.

10. The CDMA wireless network set forth in claim 7 wherein said controller shifts positions of said at least some of said identified samples corresponding to Logic 1 chips according to one of a random process algorithm and a predetermined algorithm.

11. A wireless mobile station capable of communicating with a plurality of base stations in a wireless network, said wireless mobile station comprising a reduction circuit for improving a signal-to-noise ratio of a received signal comprising a predetermined sequence of chips, each of said chips having a value corresponding to Logic 0 or Logic 1, said noise reduction circuit comprising:
   a sampling circuit capable of generating a first sequence of samples from said received signal; and
   a controller capable of identifying samples in said first sequence of samples corresponding to Logic 0 chips and identifying samples in said first sequence of samples corresponding to Logic 1 chips, wherein said controller is further capable of generating a second sequence of samples by at least one of:
      shifting positions within said first sequence of samples of at least some of said identified samples corresponding to Logic 0 chips, wherein each of said shifted samples corresponding to Logic 0 chips is shifted from a first position corresponding to a Logic 0 chip to a second position corresponding to a Logic 0 chip; and
      shifting positions within said first sequence of samples of at least some of said identified samples corresponding to Logic 1 chips, wherein each of said shifted samples corresponding to Logic 1 chips is shifted from a first position corresponding to a Logic 1 chip to a second position corresponding to a Logic 1 chip.

12. The wireless mobile station set forth in claim 11 wherein said controller adds said first and second sequences of samples to generate a composite signal having a reduced signal-to-noise ratio.

13. The wireless mobile station set forth in claim 7 wherein said controller shifts positions of said at least some of said identified samples corresponding to Logic 0 chips according to one of a random process algorithm and a predetermined algorithm.

14. The wireless mobile station set forth in claim 7 wherein said controller shifts positions of said at least some of said identified samples corresponding to Logic 1 chips according to one of a random process algorithm and a predetermined algorithm.

15. For use in a CDMA receiver, a method for improving a signal-to-noise ratio of a received signal comprising a predetermined sequence of chips, each of the chips having a value corresponding to Logic 0 or Logic 1, the method comprising the steps of:
   generating a first sequence of samples from the received signal; and
   identifying samples in the first sequence of samples corresponding to Logic 0 chips;
   identifying samples in the first sequence of samples corresponding to Logic 1 chips; and
   generating a second sequence of samples from the first sequence of samples by at least one of:
      shifting positions within the first sequence of samples of at least some of the identified samples corresponding to Logic 0 chips, wherein each of the shifted samples corresponding to Logic 0 chips is shifted from a first position corresponding to a Logic 0 chip to a second position corresponding to a Logic 0 chip; and
      shifting positions within the first sequence of samples of at least some of the identified samples corresponding to Logic 1 chips, wherein each of the shifted samples corresponding to Logic 1 chips is shifted from a first position corresponding to a Logic 1 chip to a second position corresponding to a Logic 1 chip.

16. The method set forth in claim 15 further comprising the step of adding the first and second sequences of samples to generate a composite signal having a reduced signal-to-noise ratio.

17. The method set forth in claim 15 wherein the CDMA receiver is disposed in a base station of a wireless network.

18. The method set forth in claim 15 wherein the CDMA receiver is disposed in a mobile station capable of communicating with a wireless network.

19. The method set forth in claim 15 wherein the step of shifting positions of the at least some of the identified samples corresponding to Logic 0 chips shifts the positions according to one of a random process algorithm and a predetermined algorithm.

20. The method set forth in claim 15 wherein the step of shifting positions of the at least some of the identified samples corresponding to Logic 1 chips shifts the positions according to one of a random process algorithm and a predetermined algorithm.

* * * * *